United States Patent Office 3,517,018
Patented June 23, 1970

---

3,517,018
FORMALDEHYDE ADDUCTS OF 2-MERCAPTO-PYRIDINE-N-OXIDE
Rudiger D. Haugwitz, New Haven, Conn., assignor to Olin Mathieson Chemical Corporation, a corporation of Virginia
No Drawing. Filed July 3, 1968, Ser. No. 742,160
Int. Cl. C07d 31/50
U.S. Cl. 260—294.8                                                      1 Claim

---

ABSTRACT OF THE DISCLOSURE

The invention relates to formaldehyde adducts of 2-mercaptopyridine-N-oxide and 2,2′-dithiopyridine-1,1′-dioxide. The adducts of this invention are effective biocides against a broad spectrum of bacteria and fungi. The adducts are prepared by reacting the appropriate adduct with formaldehyde, preferably an excess, and recovering the adduct. Gentle heating is usually employed to accelerate the reaction rate.

---

This invention relates to adducts of 2-mercaptopyridine-N-oxide and derivatives thereof. More particularly, this invention relates to formaldehyde adducts of the aforementioned compounds having enhanced biocidal properties.

2-mercaptopyridine-N-oxide and various derivatives thereof have been previously disclosed in the literature. For example, U.S. Patent 2,686,786 discloses that 2-mercaptopyridine-N-oxide and lower alkyl substituted 2-mercaptopyridine-N-oxides are active against a wide group of microorganisms, while the antibacterial and antifungal properties of 2,2′-dithiopyridine-1,1′-dioxide and lower alkyl substituted 2,2′-dithiopyridine-1,1′-dioxide are reported in U.S. Pat. 2,742,476.

Now it has been found that adducts having a broad range of biocidal activity can be provided according to this invention. More specifically, these adducts are the formaldehyde adducts of the following compounds:

(a) 2-mercaptopyridine-N-oxides having the formula

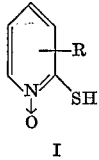

I (b) and 2,2′-dithiopyridine-1,1′-dioxides having the formula

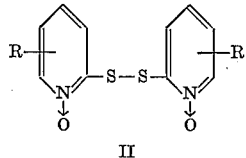

II wherein R is hydrogen or lower alkyl, i.e., alkyl having 1–4 carbon atoms, and preferably wherein R is hydrogen.

The 2-mercaptopyridine-N-oxides having the Formula I are more fully described in the aforementioned U.S. Pat. 2,686,786. These compounds are generally in tautomeric equilibrium with the corresponding cyclic thiohydroxamic acids having the formula

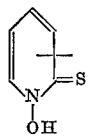

wherein R is as previously described; it is to be understood that either or both tautomeric forms are included where either is named in the claim and specification herein. As previously mentioned, the 2,2′-dithiopyridine-1,1′-dioxides are fully described in U.S. Pat. 2,742,476.

More in detail, the adducts of this invention comprise at least 2 moles of formaldehyde per mole of 2-mercaptopyridine-N-oxide I or 2,2′-dithiopyridine-1,1′-dioxide II. Thus, for example, the formaldehyde adduct of 2-mercaptopyridine-N-oxide has the formula

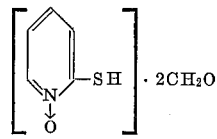

While it is not desired to be bound by theory, it is believed that the 2,2′-dithiopyridine-1,1′-dioxide adduct contains 2–6 moles of formaldehyde, depending upon the reaction conditions and time.

The adducts of this invention are prepared by reacting the appropriate 2-mercaptopyridine-N-oxide I or 2,2′-dithiopyridine-1,1′-dioxide II with formaldehyde and recovering the adduct. While the reaction proceeds readily at room temperature, gentle heating is usually employed to accelerate the reaction rate. Stoichiometric quantities of formaldehyde can be employed, but an excess amount thereof is preferably utilized. The solid adduct is readily isolated from the reaction mixture by conventional techniques such as filtration, crystallization, and the like.

The preparation of the adducts of this invention is particularly surprising and unexpected since it has been found that various other aldehydes do not react with compounds I and II to form adducts. Thus, benzaldehyde and acetaldehyde did not form an adduct with 2-mercaptopyridine-N-oxide when subjected to the same conditions employed in the preparation of the formaldehyde adduct.

The adducts of this invention have a wide range of biocidal activity. They are particularly useful in applications where both immediate and long range activity is desired. Thus, in their biocidal activity, formaldehyde is first released to function as a biocide; thereafter, the biocidal activity of the 2-mercaptopyridine-N-oxide moiety takes effect.

As previously mentioned, these adducts have broad antibacterial and antifungal spectra. For example, the following in vitro spectrum of the formaldehyde adduct of 2-mercaptopyridine-N-oxide is illustrative.

TABLE

| Organism: | MIC (p.p.m.) |
|---|---|
| Streptococcus faecalis | 0.4 |
| Pseudomonas aeruginosa | 3.1 |
| Salmonella schottmülleri | 1.5 |
| Staphylococcus aureus | 1.5 |
| Proteus vulgaris | 3.1 |
| Aerobacter aerogenes | 3.1 |
| Bacillus subtilis | 1.5 |
| Klebsiella pneumoniae | 1.5 |
| Escherichia coli | 1.5 |
| Lactobacillus casei | 0.4 |

Furthermore, the adducts of this invention are light stable, and thus may be advantageously employed in applications where light stable biocides are required.

In view of the aforementioned properties, the adducts of this invention can be employed as biocides for plastics, such as polyethylene, and fabrics. In this application, they can be incorporated into the resin prior to fabrication.

The adducts of this invention are also valuable soil fungicides when incorporated into the soil in a conventional manner.

The following examples will serve to illustrate the preparation of various 2-mercaptopyridine-N-oxides I and 2,2′-dithiopyridine-1,1′-dioxides II in accordance with the practice of this invention.

EXAMPLE 1

2-mercaptopyridine-N-oxide (4 g.) was added to 20 ml. of 37% aqueous formaldehyde and the resulting mixture warmed to effect solution. After cooling to room temperature, the reaction mixture was allowed to stand for about one hour; a solid material separated therefrom. The solid was separated from the reaction mixture by filtration, washed with water and recrystallized from methanol to provide 4.3 g. of solid product, M.P. 135–37° C. The following analytical data revealed that an adduct comprising two moles of formaldehyde and one mole of 2-mercaptopyridine-N-oxide had been obtained.

*Analysis.*—Calc'd for $C_5H_5NO \cdot 2CHS_2O$ (percent): C, 44.68; H, 5.36; N, 7.44. Found (percent): C, 44.99; H, 4.99; N, 7.24.

EXAMPLE 2

Following the procedure of Example 1, a mixture of 25 ml. of 37% aqueous formaldehyde and 3 g. of 2,2′-dithiopyridine-1,1′-dioxide was warmed on a steam bath for 20 minutes. Upon cooling to room temperature, a feathery, crystalline material separated from the reaction mixture. Filtration provided 2 g. of this crystalline material. No melting point could be determined since the product released formaldehyde upon heating above 100° C. Infrared analysis revealed absorption peaks at 3210, 1180, 1010, 955 and 925 cm.$^{-1}$; the 3210 band indicated OH stretching while C-O stretching was revealed by the presence of the 1010 band. The infrared spectrum for pure 2,2′-dithiopyridine-1,1′-dioxide did not show any of the aforementioned bands.

What is claimed is:

1. An adduct having the following formula

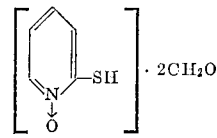

References Cited

UNITED STATES PATENTS 2,686,786    8/1954    Shaw et al. _____ 260—294.8
2,742,476    10/1956   Bernstein et al. ____ 260—294.8

OTHER REFERENCES

Itai: Chemical Abstracts, vol. 44, cols. 4473–4, 1950.

ALAN L. ROTMAN, Primary Examiner

U.S. Cl. X.R.

424—263